United States Patent
Obara et al.

(10) Patent No.: US 10,309,455 B2
(45) Date of Patent: Jun. 4, 2019

(54) SQUEEZE FILM DAMPER BEARING DEVICE

(71) Applicant: HONDA MOTOR CO., LTD., Tokyo (JP)

(72) Inventors: Shinichi Obara, Wako (JP); Atsushi Yamazaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/898,934

(22) Filed: Feb. 19, 2018

(65) Prior Publication Data
US 2018/0245632 A1 Aug. 30, 2018

(30) Foreign Application Priority Data

Feb. 24, 2017 (JP) ................................. 2017-033476

(51) Int. Cl.
| | | |
|---|---|---|
| *F16C 27/04* | (2006.01) | |
| *F16F 15/023* | (2006.01) | |
| *F16C 33/66* | (2006.01) | |
| *F01D 25/16* | (2006.01) | |
| *F01D 25/20* | (2006.01) | |

(52) U.S. Cl.
CPC .......... *F16C 27/045* (2013.01); *F01D 25/164* (2013.01); *F16C 33/667* (2013.01); *F16F 15/0237* (2013.01); *F01D 25/20* (2013.01); *F05D 2240/54* (2013.01); *F05D 2260/96* (2013.01); *F05D 2270/304* (2013.01); *F16C 2360/23* (2013.01)

(58) Field of Classification Search
CPC ...... F16C 19/06; F16C 19/525; F16C 19/527; F16C 27/045; F16C 2360/23; F16C 15/0237
See application file for complete search history.

(56) References Cited

U.S. PATENT DOCUMENTS

| | | | | |
|---|---|---|---|---|
| 3,456,992 A | * | 7/1969 | Kulina | ................... F16C 27/045 384/100 |
| 5,149,206 A | * | 9/1992 | Bobo | ..................... F01D 25/164 248/562 |
| 7,798,720 B1 | * | 9/2010 | Walsh | ................... F04D 29/126 384/99 |

(Continued)

FOREIGN PATENT DOCUMENTS

| | | | | | |
|---|---|---|---|---|---|
| DE | 102010024689 A1 | * | 12/2011 | ............. | F16C 27/045 |
| JP | 03172645 A | * | 7/1991 | ................ | F16F 9/52 |
| JP | 2003-083325 | | 3/2003 | | |

*Primary Examiner* — Phillip A Johnson
(74) *Attorney, Agent, or Firm* — Rankin, Hill & Clark LLP

(57) ABSTRACT

A squeeze film damper bearing device includes an inner race that is fitted around an outer periphery of a rotating shaft, an outer race that is supported on an inner periphery of a bearing retaining member via an annular space, a plurality of rolling bodies that are disposed between the inner race and the outer race, and an oil supply source that supplies oil to the annular space via an oil passage so as to form a squeeze film. The device further includes an open/close valve that opens and closes the oil passage. When a rotational speed of the rotating shaft reaches a predetermined rotational speed, the open/close valve is controlled so as to change oil pressure of the squeeze film, thus changing vibration characteristics of the rotating shaft.

3 Claims, 3 Drawing Sheets

(56) References Cited

U.S. PATENT DOCUMENTS

| | | | |
|---|---|---|---|
| 9,494,048 B1* | 11/2016 | Parnin | F16F 15/0237 |
| 2010/0207008 A1* | 8/2010 | Cottrell | B64D 27/26 |
| | | | 248/638 |
| 2012/0328226 A1* | 12/2012 | Gloeckner | F16C 27/045 |
| | | | 384/476 |

* cited by examiner

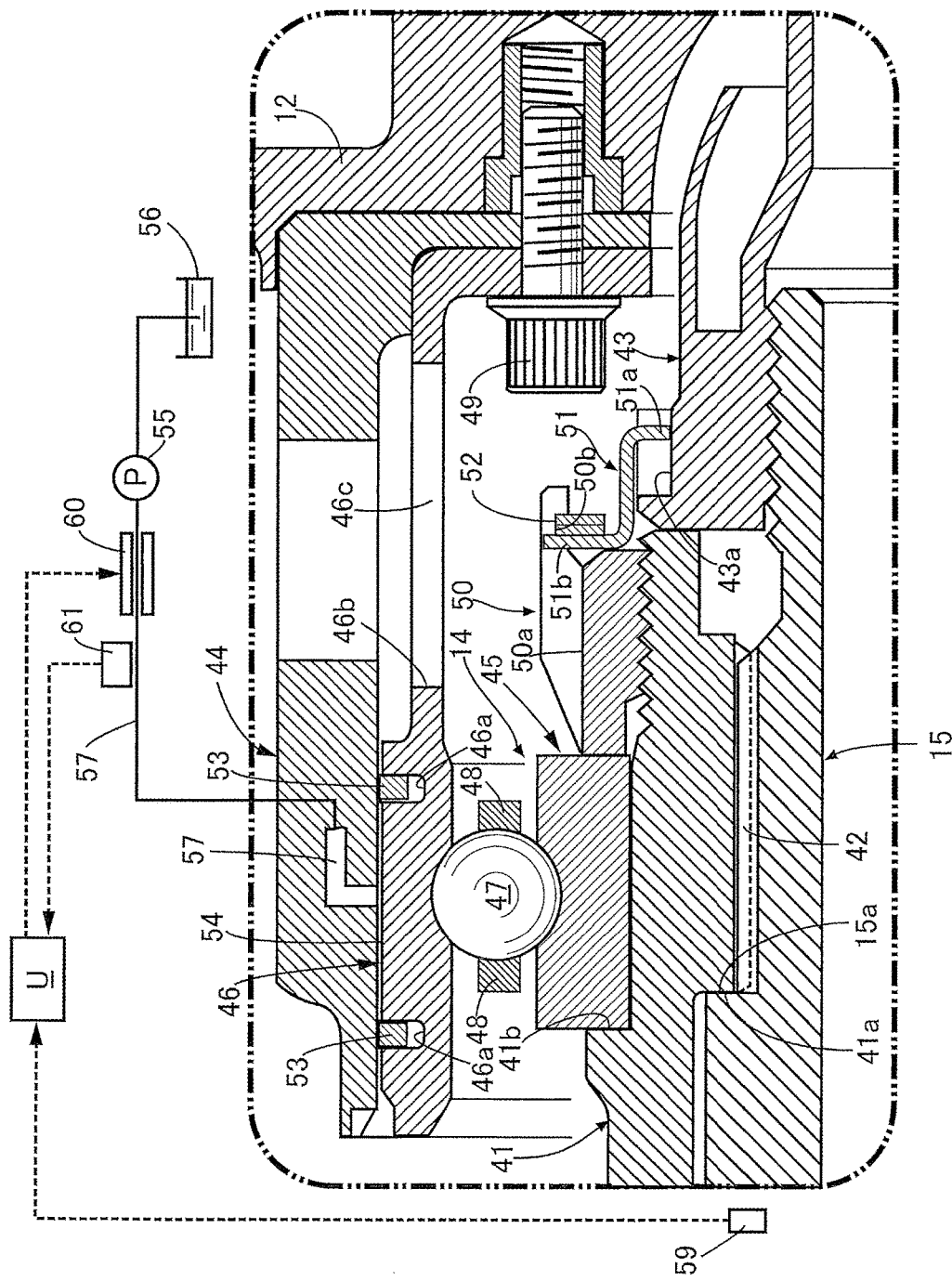

SQUEEZE FILM DAMPER BEARING DEVICE

CROSS REFERENCE TO RELATED APPLICATIONS

The present application claims priority under 35 U.S.C. § 119 to Japanese Patent Application No. 2017-33476 filed Feb. 24, 2017 the entire contents of which are hereby incorporated by reference.

BACKGROUND OF THE INVENTION

Field of the Invention

The present invention relates to a squeeze film damper bearing device having an inner race that is fitted around an outer periphery of a rotating shaft, an outer race that is supported on an inner periphery of a bearing retaining member via an annular space, a plurality of rolling bodies that are disposed between the inner race and the outer race, and an oil supply source that supplies oil to the annular space via an oil passage so as to form a squeeze film.

Description of the Related Art

A squeeze film damper bearing device for damping vibration of a rotating shaft, which rotates at high speed, of a gas turbine engine, etc. is known from for example Japanese Patent Application Laid-open No. 2003-83325.

When the rotational speed of the rotating shaft of the gas turbine engine approaches a predetermined rotational speed, the rotating shaft can sometimes resonate and enter a high vibration mode in which it vibrates strongly. In order to avoid this, conventionally the distance in the axial direction of a plurality of bearings supporting the rotating shaft is changed, or the shaft diameter (rigidity) of the rotating shaft is changed, thereby the rotational speed at which the rotating shaft resonates and enters a high vibration mode is changed from a regular rotational speed region to the low rotational speed side or the high rotational speed side.

However, changing the position in the axial direction of the bearing supporting the rotating shaft has the problem that the degree of freedom in design of the position of the bearing is degraded or the dimensions of the gas turbine engine increase, and changing the shaft diameter of the rotating shaft has the problem that the strength of the rotating shaft is degraded or the weight is increased.

SUMMARY OF THE INVENTION

The present invention has been accomplished in light of the above circumstances, and it is an object thereof to provide a squeeze film damper bearing device that can reliably prevent, with a simple structure, a rotating shaft supported thereby from entering a high vibration mode.

In order to achieve the object, according to a first aspect of the present invention, there is provided a squeeze film damper bearing device including an inner race that is fitted around an outer periphery of a rotating shaft, an outer race that is supported on an inner periphery of a bearing retaining member via an annular space, a plurality of rolling bodies that are disposed between the inner race and the outer race, and an oil supply source that supplies oil to the annular space via an oil passage so as to form a squeeze film, wherein the device further includes an open/close valve that opens and closes the oil passage, and when a rotational speed of the rotating shaft reaches a predetermined rotational speed, the open/close valve is controlled so as to change oil pressure of the squeeze film, thus changing vibration characteristics of the rotating shaft.

According to a second aspect of the present invention, there is provided a squeeze film damper bearing device including an inner race that is fitted around an outer periphery of a rotating shaft, an outer race that is supported on an inner periphery of a bearing retaining member via an annular space, a plurality of rolling bodies that are disposed between the inner race and the outer race, and an oil supply source that supplies oil to the annular space via an oil passage so as to form a squeeze film, wherein the device further includes oil temperature adjustor that adjusts a temperature of the oil, and when a rotational speed of the rotating shaft reaches a predetermined rotational speed, the temperature of the oil is adjusted by the oil temperature adjustor so as to change a viscosity of oil of the squeeze film, thus changing vibration characteristics of the rotating shaft.

In accordance with the first or second aspect, since the squeeze film damper bearing device includes the inner race fitted around the outer periphery of the rotating shaft, the outer race supported on the inner periphery of the bearing retaining member via the annular space, the plurality of rolling bodies disposed between the inner race and the outer race, and the oil supply source for supplying oil to the annular space via the oil passage so as to form a squeeze film, when the outer race is displaced relative to the inner periphery of the bearing retaining member in response to vibration of the rotating shaft, the squeeze film formed in the annular space sandwiched between the inner periphery of the bearing retaining member and the outer periphery of the outer race resists movement of the outer race, thus enabling the vibration of the rotating shaft to be damped.

There is a possibility that when the rotational speed of the rotating shaft approaches a predetermined rotational speed the rotating shaft will resonate and enter a high vibration mode, but in accordance with the first aspect of the present invention, since the open/close valve for opening and closing the oil passage is provided, and when the rotational speed of the rotating shaft reaches a predetermined rotational speed, the open/close valve is controlled so as to change the oil pressure of the squeeze film, thus changing the vibration characteristics of the rotating shaft, it is possible, by shifting the resonant frequency, to prevent the rotating shaft from entering a high vibration mode, thereby avoiding any degradation in the durability of the bearing.

There is a possibility that when the rotational speed of the rotating shaft approaches a predetermined rotational speed the rotating shaft will resonate and enter a high vibration mode, but in accordance with the second aspect of the present invention, since the oil temperature adjuster for adjusting the temperature of the oil is provided, and when the rotational speed of the rotating shaft reaches a predetermined rotational speed, the temperature of the oil is adjusted by the oil temperature adjuster so as to change the viscosity of oil of the squeeze film, thus changing the vibration characteristics of the rotating shaft, it is possible, by shifting the resonant frequency, to prevent the rotating shaft from entering a high vibration mode, thereby avoiding any degradation in the durability of the bearing.

Note that a low pressure system shaft 15 and a sleeve 41 of embodiments correspond to the rotating shaft of the present invention, balls 47 of the embodiments correspond to the rolling bodies of the present invention, an oil pump 55 of the embodiments corresponds to the oil supply source of the present invention, and an oil heater 60 of the embodiments corresponds to the oil temperature adjustor of the present invention.

BRIEF DESCRIPTION OF THE DRAWINGS

The above and other objects, characteristics and advantages of the present invention will be clear from detailed descriptions of the preferred embodiments which will be provided below while referring to the attached drawings.

FIG. 3 is a view corresponding to FIG. 2. (second embodiment)

DESCRIPTION OF THE PREFERRED EMBODIMENTS

First Embodiment

A first embodiment of the present invention is explained below with reference to FIGS. 1 and 2.

Figure 1:
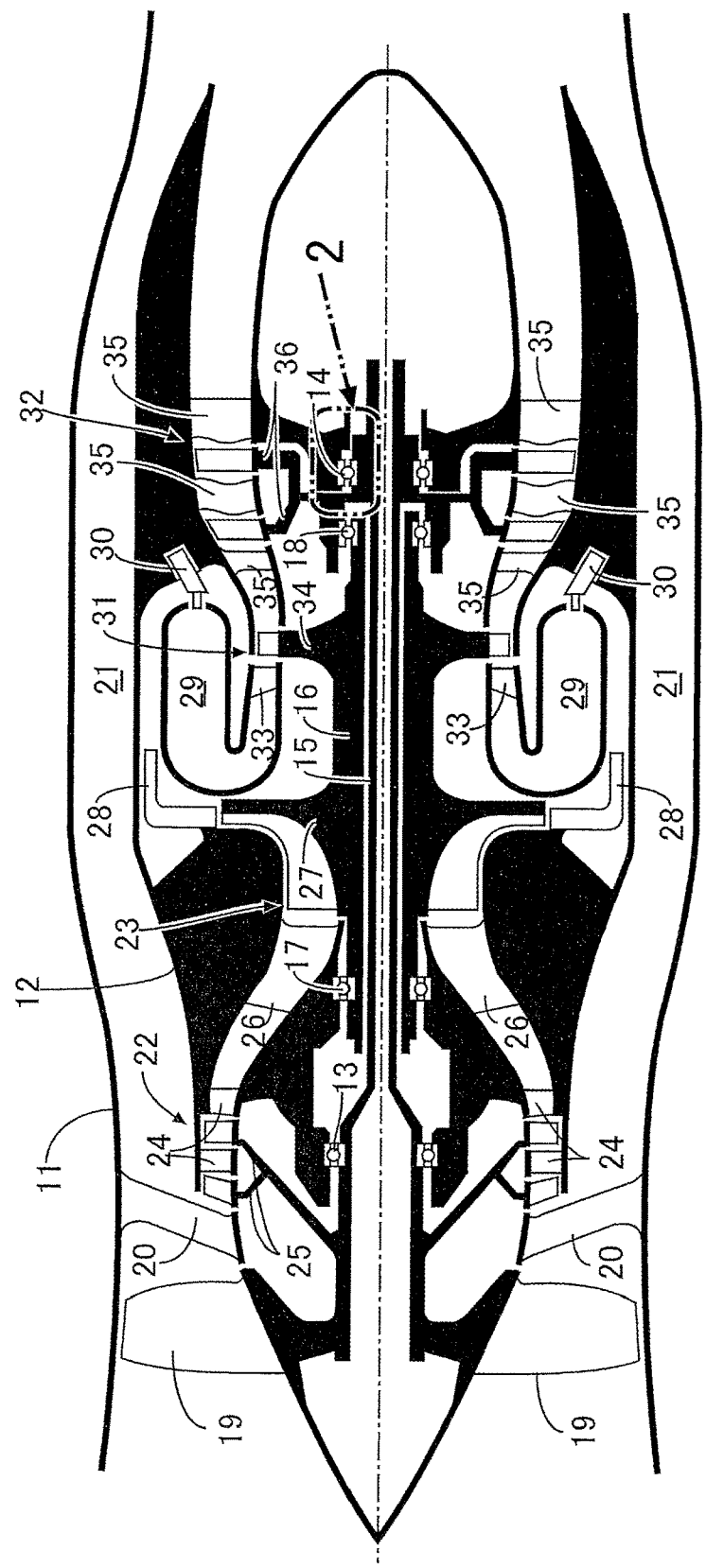
FIG. 1 is a diagram showing the overall structure of a gas turbine engine. (first embodiment)
Figure 2:
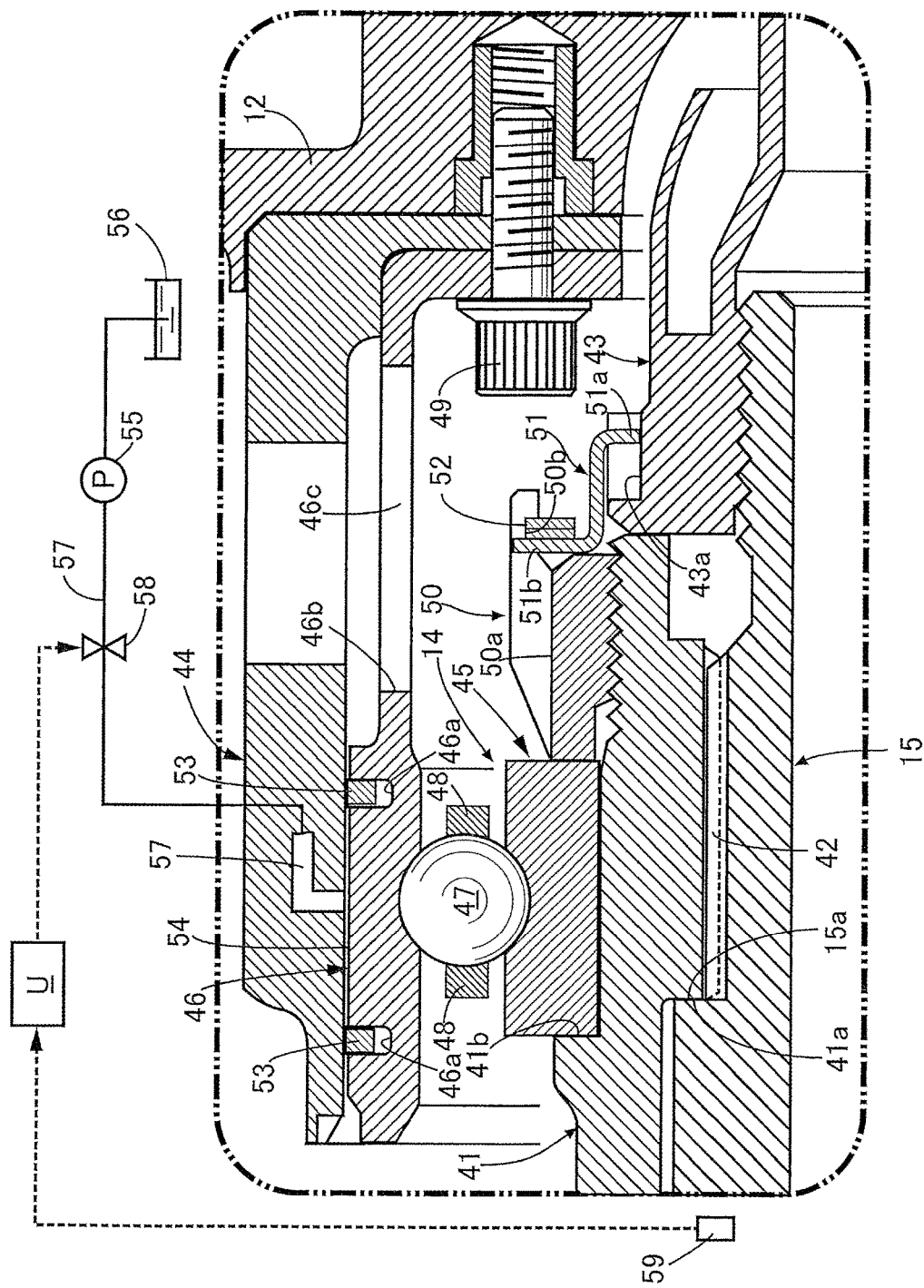
FIG. 2 is an enlarged view of part 2 in FIG. 1. (first embodiment)

As shown in FIG. 1, a gas turbine engine for an aircraft to which the present invention is applied includes an outer casing 11 and an inner casing 12, and a front part and a rear part of a low pressure system shaft 15 are rotatably supported in the interior of the inner casing 12 via a front first bearing 13 and a rear first bearing 14 respectively. A tubular high pressure system shaft 16 is relatively rotatably fitted around the outer periphery of an intermediate part in the axial direction of the low pressure system shaft 15, a front part of the high pressure system shaft 16 is rotatably supported on the inner casing 12 via a front second bearing 17, and a rear part of the high pressure system shaft 16 is relatively rotatably supported on the low pressure system shaft 15 via a rear second bearing 18.

A front fan 19 is fixed to the front end of the low pressure system shaft 15, blade ends of the front fan 19 facing an inner face of the outer casing 11. Part of the air drawn or sucked in by the front fan 19 passes through stator vanes 20 disposed between the outer casing 11 and the inner casing 12, part thereof then passes through an annular bypass duct 21 formed between the outer casing 11 and the inner casing 12 and is jetted rearward, and another part thereof is supplied to an axial type low pressure compressor 22 and a centrifugal type high pressure compressor 23 disposed in the interior of the inner casing 12.

The low pressure compressor 22 includes stator vanes 24 fixed to the interior of the inner casing 12 and a low pressure compressor wheel 25 equipped with compressor blades on the outer periphery and fixed to the low pressure system shaft 15. The high pressure compressor 23 includes stator vanes 26 fixed to the interior of the inner casing 12 and a high pressure compressor wheel 27 equipped with compressor blades on the outer periphery and fixed to the high pressure system shaft 16.

A reverse flow combustion chamber 29 is disposed to the rear of a diffuser 28 connected to the outer periphery of the high pressure compressor wheel 27, and fuel is injected into the interior of the reverse flow combustion chamber 29 from a fuel injection nozzle 30. Fuel and air are mixed in the interior of the reverse flow combustion chamber 29 and undergo combustion, and the combustion gas thus generated is supplied to a high pressure turbine 31 and a low pressure turbine 32.

The high pressure turbine 31 includes nozzle guide vanes 33 fixed to the interior of the inner casing 12 and a high pressure turbine wheel 34 equipped with turbine blades on the outer periphery and fixed to the high pressure system shaft 16. The low pressure turbine 32 includes nozzle guide vanes 35 fixed to the interior of the inner casing 12 and a low pressure turbine wheel 36 equipped with turbine blades on the outer periphery and fixed to the low pressure system shaft 15.

Therefore, when the high pressure system shaft 16 is driven with a starter motor (not shown), air that has been drawn or sucked in by the high pressure compressor wheel 27 is supplied to the reverse flow combustion chamber 29, mixed with fuel and undergoes combustion, and the combustion gas thus generated drives the high pressure turbine wheel 34 and the low pressure turbine wheel 36. As a result, the low pressure system shaft 15 and the high pressure system shaft 16 rotate, and the front fan 19, the low pressure compressor wheel 25, and the high pressure compressor wheel 27 compress air and supply it to the reverse flow combustion chamber 29, thus enabling the gas turbine engine to continue to run even when the starter motor is stopped.

While the gas turbine engine is running, part of the air drawn or sucked in by the front fan 19 passes through the bypass duct 21 and is jetted rearward thus generating the main thrust, particularly when flying at low speed. The remaining part of the air drawn or sucked in by the front fan 19 is supplied to the reverse flow combustion chamber 29, mixed with fuel, and undergoes combustion, and it drives the low pressure system shaft 15 and the high pressure system shaft 16 and is then jetted rearward, thus generating thrust.

The structure around the rear first bearing 14 is now explained by reference to FIG. 2.

A sleeve 41 for supporting the low pressure turbine wheel 36 is fitted around the outer periphery of the low pressure system shaft 15 by a spline fitting 42. The sleeve 41 is fastened to the low pressure system shaft 15 by screwing a first nut member 43 around the outer periphery of a shaft end of the low pressure system shaft 15 so as to push the sleeve 41 leftward in FIG. 2, thereby pressing a step portion 41*a* formed on the inner periphery of the sleeve 41 against a step portion 15*a* formed on the outer periphery of the low pressure system shaft 15.

The rear first bearing 14 includes an inner race 45 fitted around the outer periphery of the sleeve 41, an outer race 46 fitted into the inner periphery of a bearing retaining member 44 provided on the inner casing 12, a plurality of balls 47 disposed between the inner race 45 and the outer race 46, and a retainer 48 retaining the balls 47 at predetermined intervals in the peripheral direction. The bearing retaining member 44 and the outer race 46 are fastened to the inner casing 12 by bolts 49, and the inner race 45 is fastened by being urged leftward in FIG. 2 by a second nut member 50 screwed around the outer periphery of an end part of the sleeve 41, thereby being pressed against a step portion 41*b* formed on the outer periphery of the sleeve 41.

The outer race 46 includes a plurality of slit-shaped cutouts 46*b* extending in the axial direction and a plurality of rod-shaped spring portions 46*c* sandwiched between the plurality of cutouts 46*b* and extending in the axial direction, and a main body part of the outer race 46 retaining the balls 47 is therefore floatingly supported so as to be capable of moving relative to the inner casing 12.

The direction in which the first nut member 43 is screwed and the direction in which the second nut member 50 is screwed are set so as to be opposite to each other. That is, when the first nut member 43 is a right-hand screw, the second nut member 50 is a left-hand screw, and when the first nut member 43 is a left-hand screw, the second nut member 50 is a right-hand screw. A plurality of first groove portions 43a opening rightward in the axial direction in FIG. 2 are formed in the outer periphery of an end part of the first nut member 43 at equal intervals in the peripheral direction, and a plurality of second groove portions 50a opening rightward in the axial direction in FIG. 2 are formed in the outer periphery of the second nut member 50 at equal intervals in the peripheral direction.

An annular linking member 51 disposed between the first nut member 43 and the second nut member 50 includes two first projecting portions 51a that are disposed at intervals of 180° in the circumferential direction and can engage with the first groove portions 43a of the first nut member 43, and three second projecting portions 51b that are disposed at intervals of 120° in the circumferential direction and can engage with the second groove portions 50a of the second nut member 50.

A ring spring 52 that makes the linking member 51 latch with the second nut member 50 is one that is formed by winding a flat elastic metal plate with substantially two rotations into a ring shape, and an outer peripheral part thereof can engage with step portions 50b formed on the inner periphery of an end part of the second nut member 50.

Since the directions in which the first nut member 43 and the second nut member 50 are screwed are opposite to each other, if the first nut member 43 attempts to rotate in a direction in which it is loosened, the rotation acts on the second nut member 50 via the linking member 51 so as to tighten it, and it is thus possible to prevent both the first nut member 43 and the second nut member 50 from becoming loosened. Conversely, if the second nut member 50 attempts to rotate in a direction in which it is loosened, since the rotation acts on the first nut member 43 via the linking member 51 so as to tighten it, it is possible to simultaneously prevent both the first nut member 43 and the second nut member 50 from becoming loosened.

The rear first bearing 14 supporting the rear part of the low pressure system shaft 15 forms a squeeze film damper bearing, and seal rings 53 are fitted into a pair of seal ring grooves 46a formed in the outer periphery of the outer race 46 thereof. The seal rings 53 expand radially outward due to self resilience and resiliently abut against the inner periphery of the bearing retaining member 44, and an annular space 54 having a predetermined gap in the radial direction is defined between the outer periphery of the outer race 46, the inner periphery of the bearing retaining member 44, and the pair of seal rings 53. Therefore, the outer race 46 can undergo relative movement within the range of the above gap in the radial direction relative to the bearing retaining member 44, and in this process the seal rings 53 undergo elastic deformation within the seal ring grooves 46a, thus maintaining a state of abutment against the inner periphery of the bearing retaining member 44.

Oil sucked up from the oil tank 56 by the oil pump 55 is supplied to the annular space 54 via an oil passage 57 formed in the interior of the inner casing 12 and the bearing retaining member 44. An open/close valve 58, which preferably is a solenoid valve, is disposed in the oil passage 57 in the interior of the inner casing 12; when the open/close valve 58 closes, the oil passage 57 is blocked, and supply of oil from the oil pump 55 to the annular space 54 is cut off.

An electronic control unit U, which is a microcomputer, controls opening and closing of the open/close valve 58 based on the rotational speed of the low pressure system shaft 15, that is, the rotational speed of the sleeve 41, detected by rotational speed detector 59.

The operation of the first embodiment of the present invention having the above arrangement is now explained.

When oil is supplied from the oil pump 55 to the annular space 54 via the inner casing 12 and the oil passage 57 of the bearing retaining member 44, a squeeze film is formed from a thin film of oil in the annular space 54. When the low pressure system shaft 15 vibrates in the radial direction while the gas turbine engine is running, the vibration is transmitted to the outer race 46 of the rear first bearing 14 having the inner race 45 supported on the sleeve 41 integrally fixed to the low pressure system shaft 15.

In this process, since vibration in the radial direction of the outer race 46 of the rear first bearing 14 is allowed due to the spring portions 46c undergoing elastic deformation, the size of the gap in the radial direction of the annular space 54 increases and decreases according to the vibration in the radial direction of the outer race 46, the outer race 46 is damped by a resistance force generated by flow and compression of viscous oil of the squeeze film within the annular space 54, and this enables the vibration of the low pressure system shaft 15 to be suppressed.

When the squeeze film exhibits a damping effect, oil that has absorbed vibrational energy generates heat and its temperature increases, but oil whose temperature has increased is discharged successively via abutment clearances of the seal rings 53 and fresh oil is supplied from the oil pump 55, thus maintaining the damping function of the squeeze film.

Within a regular rotational speed region of the low pressure system shaft 15 of the gas turbine engine, for example, in a predetermined high rotational speed region, the low pressure system shaft 15 can sometimes resonate and enter a high vibration mode in which it vibrates strongly. In this high vibration mode, since the low pressure system shaft 15 vibrates strongly, it becomes difficult to suppress the vibration with the regular damping force of the squeeze film.

However, in accordance with this embodiment, when the rotational speed of the low pressure system shaft 15 detected by the rotational speed detector 59 reaches a predetermined high rotational speed region, the electronic control unit U controls the open/close valve 58 disposed in the oil passage 57 between the oil pump 55 and the annular space 54 so as to close it, thus cutting off the supply of oil pressure to the squeeze film of the annular space 54. This enables the characteristics of the squeeze film to be changed, and the resonant frequency of the low pressure system shaft 15 to be shifted, thus preventing the low pressure system shaft 15 from resonating and thereby avoiding any degradation in the durability of the rear first bearing 14 due to resonance.

As described above, in accordance with this embodiment, since the occurrence of a high vibration mode can be prevented without changing the position in the axial direction of the rear first bearing 14 supporting the sleeve 41 of the low pressure system shaft 15 and without changing the shaft diameter of the low pressure system shaft 15, it is possible to avoid any decrease in the degree of freedom in design of the gas turbine engine and any increase in the dimensions and also to avoid any decrease in the strength of the rear first bearing 14 and any increase in the weight.

Second Embodiment

A second embodiment of the present invention is now explained with reference to FIG. 3.

In the second embodiment, instead of the open/close valve 58 of the first embodiment, an oil heater 60 for heating oil and increasing its temperature is provided. The electronic control unit U carries out feedback control of operation of the oil heater 60 such that, when the rotational speed of the low pressure system shaft 15 detected by the rotational speed detector 59 reaches a predetermined high rotational speed region, the oil heater 60 is operated so as to heat the oil and the oil temperature detected by the temperature detector 61 attains a predetermined temperature.

When the temperature of oil of the squeeze film of the annular space 54 is changed in this way, the viscosity of the oil is changed, the characteristics of the squeeze film change, and the resonant frequency of the low pressure system shaft 15 is shifted, thereby preventing the low pressure system shaft 15 from resonating.

Embodiments of the present invention are explained above, but the present invention may be modified in a variety of ways as long as the modifications do not depart from the gist of the present invention.

For example, the subject to which the present invention is applied is not limited to the rear first bearing 14 of the gas turbine engine of the embodiments, and it may be applied to another bearing of a gas turbine engine, and it is also possible to apply it to a bearing of any application other than a gas turbine engine.

Furthermore, the open/close valve 58 of the first embodiment opens and closes the oil passage 57, but the open/close valve 58 may be one that narrows down the oil passage 57.

Furthermore, the rear first bearing 14 of the embodiments is a ball bearing, but it may be another type of bearing such as a roller bearing or a needle bearing.

What is claimed is:

1. A squeeze film damper bearing device comprising an inner race that is fitted around an outer periphery of a rotating shaft, an outer race that is supported on an inner periphery of a bearing retaining member with an annular space defined between an outer periphery of the outer race and the inner periphery of the bearing retaining member, a plurality of rolling bodies that are disposed between the inner race and the outer race, and an oil supply source that supplies oil to the annular space via an oil passage so as to form a squeeze film, wherein the squeeze film damper bearing device further comprises:

an open/close valve that opens and closes the oil passage; and an electronic control unit in communication with a rotational speed detector that detects a rotational speed of the rotating shaft, the electronic control unit controlling operation of the open/close valve, wherein when the rotational speed of the rotating shaft detected by the rotational speed detector reaches a predetermined rotational speed, the electronic control unit controls the open/close valve so as to change oil pressure of the squeeze film to change vibration characteristics of the rotating shaft.

2. A squeeze film damper bearing device comprising an inner race that is fitted around an outer periphery of a rotating shaft, an outer race that is supported on an inner periphery of a bearing retaining member via an annular space, a plurality of rolling bodies that are disposed between the inner race and the outer race, and an oil supply source that supplies oil to the annular space via an oil passage so as to form a squeeze film, wherein the squeeze film damper bearing device further comprises:

an oil temperature adjuster that adjusts a temperature of the oil; and an electronic control unit in communication with a rotational speed detector that detects a rotational speed of the rotating shaft, the electronic control unit controlling operation of the oil temperature adjuster, wherein when the rotational speed of the rotating shaft detected by the rotational speed detector reaches a predetermined rotational speed, the electronic control unit control the oil temperature adjuster to adjust the temperature of the oil so as to change a viscosity of oil of the squeeze film to change vibration characteristics of the rotating shaft.

3. The squeeze film damper bearing device according to claim 2, wherein the annular space is defined between an outer periphery of the outer race and the inner periphery of the bearing retaining member.

* * * * *